United States Patent
Yanai et al.

(10) Patent No.: US 12,194,377 B2
(45) Date of Patent: Jan. 14, 2025

(54) INITIAL SETTING METHOD FOR INFORMATION PROCESSING DEVICE, INFORMATION PROCESSING DEVICE, AND TERMINAL DEVICE

(71) Applicant: SONY INTERACTIVE ENTERTAINMENT INC., Tokyo (JP)

(72) Inventors: Shin Yanai, Tokyo (JP); Satoru Matsuda, Tokyo (JP); Takuya Sato, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 348 days.

(21) Appl. No.: 17/636,200

(22) PCT Filed: Sep. 23, 2020

(86) PCT No.: PCT/JP2020/035858
§ 371 (c)(1),
(2) Date: Feb. 17, 2022

(87) PCT Pub. No.: WO2021/065636
PCT Pub. Date: Apr. 8, 2021

(65) Prior Publication Data
US 2022/0280866 A1 Sep. 8, 2022

(30) Foreign Application Priority Data
Oct. 3, 2019 (JP) .................. 2019-183131

(51) Int. Cl.
*G06F 13/00* (2006.01)
*A63F 13/327* (2014.01)
(Continued)

(52) U.S. Cl.
CPC ............ *A63F 13/327* (2014.09); *H04L 67/14* (2013.01); *H04W 76/10* (2018.02)

(58) Field of Classification Search
CPC ........ G06F 21/31; H04L 67/14; A63F 13/327; H04W 76/10
(Continued)

(56) References Cited

U.S. PATENT DOCUMENTS 9,120,452 B2 * 9/2015 Nishimoto .............. B60R 25/24
11,057,948 B2 * 7/2021 Wu ........................ H04W 48/16
(Continued)

FOREIGN PATENT DOCUMENTS

| JP | 2008244945 A | 10/2008 |
|----|--------------|---------|
| JP | 2009182564 A | 8/2009 |

(Continued)

OTHER PUBLICATIONS

International Search Report and Written Opinion mailed Dec. 22, 2020, from PCT/JP2020/035858, 10 sheets.
(Continued)

*Primary Examiner* — Kenneth R Coulter
(74) *Attorney, Agent, or Firm* — XSENSUS LLP

(57) ABSTRACT

A game device 10 wirelessly transmits an SSID, and a terminal device 6 acquires the SSID from the game device 10. The game device 10 generates a passcode and displays information associated with the passcode on a display. The terminal device 6 acquires the passcode from an image having been displayed on the display. The terminal device 6 makes a wireless connection to the game device 10 by using the acquired SSID and passcode and transmits, to the terminal device 6, setting information for a wireless connection to an access point. The terminal device 6 registers the setting information for the wireless connection to the access point.

20 Claims, 6 Drawing Sheets

(51) Int. Cl.
*H04L 67/14* (2022.01)
*H04W 76/10* (2018.01)

(58) Field of Classification Search
USPC .............................. 709/227–229; 726/5, 7, 3
See application file for complete search history.

(56) References Cited

U.S. PATENT DOCUMENTS

2013/0179005 A1* 7/2013 Nishimoto .......... B60R 25/1001
701/2
2020/0059978 A1* 2/2020 Wu ....................... H04W 12/73

FOREIGN PATENT DOCUMENTS

| JP | 2012-005037 A | 1/2012 |
| JP | 2014-093781 A | 5/2014 |
| JP | 2015-005226 A | 1/2015 |
| JP | 2015052976 A | 3/2015 |
| JP | 2017-175447 A | 9/2017 |

OTHER PUBLICATIONS

Notice of Reasons for Refusal dated Mar. 28, 2023, from Japanese Patent Application No. 2019-183131, 4 sheets.

* cited by examiner

4

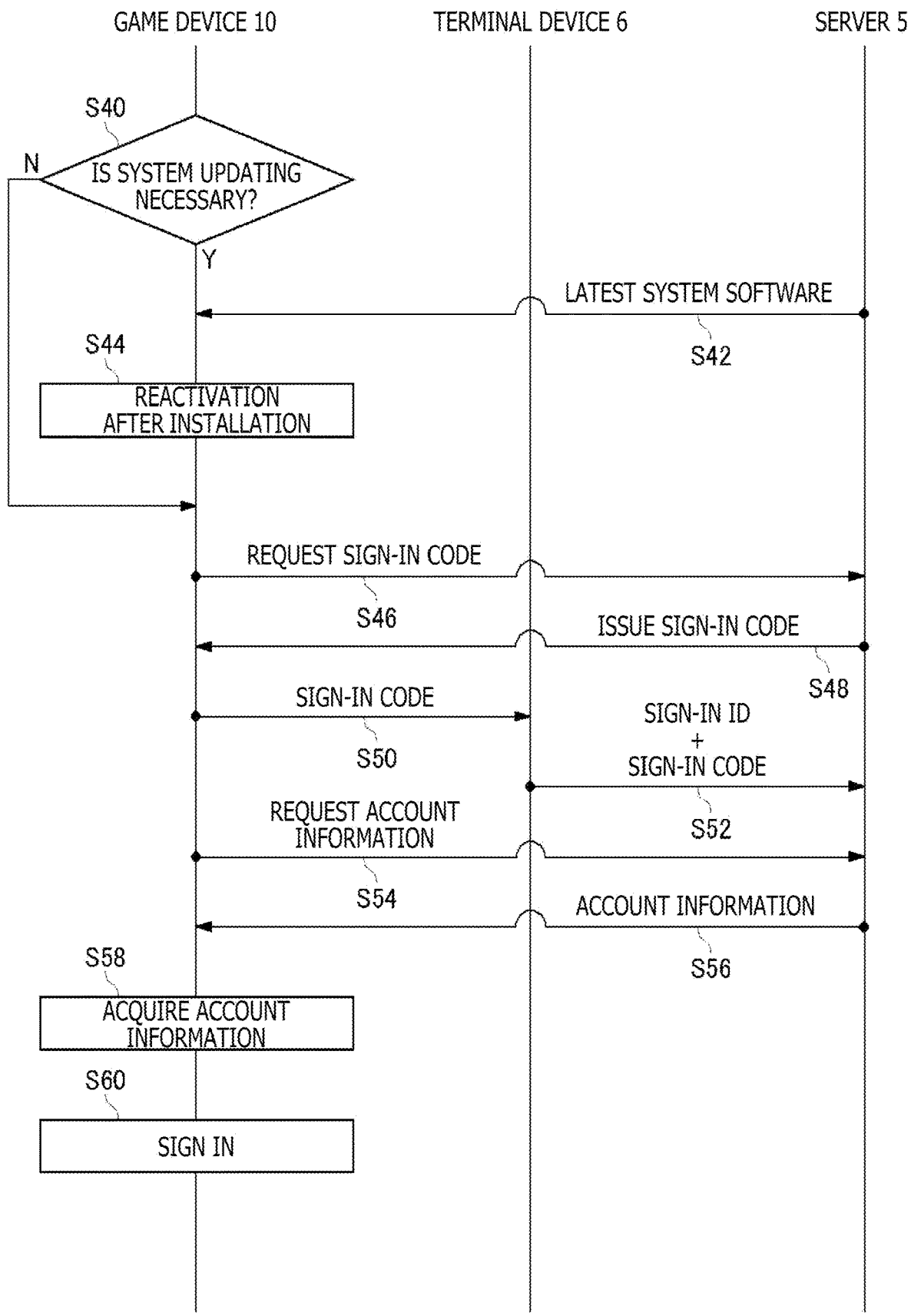

INITIAL SETTING METHOD FOR INFORMATION PROCESSING DEVICE, INFORMATION PROCESSING DEVICE, AND TERMINAL DEVICE

TECHNICAL FIELD

The present invention relates to technology in relation to an initial setting for an information processing device.

BACKGROUND ART

In PTL 1, there is disclosed an information processing system in which an information processing device which is a game device is connected to a server via the Internet. When a user has registered a network account into the game device and has signed in the server, the user becomes able to use a network service provided by the server. The server manages various kinds of data such as a user icon and an online identifier (ID) in a way that associates the various kinds of data with a sign-in ID constituting the network account of the user.

When a user who already possesses his or her network account has purchased a stationary-type game device, after coupling the game device to a display, the user makes initial settings such as the selection of a language to be used, the setting for a wireless (WiFi (registered trademark)) connection, and the setting of a date and a time of day. Upon completion of such initial settings, the user registers his or her own network account into the game device according to a predetermined registration procedure and signs in the server.

CITATION LIST

Patent Literature

[PTL 1]
Japanese Patent Laid-open No. 2015-5226

SUMMARY

Technical Problem

In the setting for a wireless connection, the game device acquires service set identifiers (SSIDs) from a plurality of access points existing in a surrounding area and displays the SSIDs on the display. The user selects an SSID of an access point at his or her home from among the SSIDs of an SSID list and inputs a passcode corresponding to the selected SSID. However, in a case where the user forgets the SSID and/or the passcode, the user is unable to select the SSID of the access point at his or her home and to input the passcode. Thus, it is desired to construct a mechanism that makes it possible to easily register setting information for the wireless connection.

Solution to Problem

In order to solve the above problem, an initial setting method for an information processing device, according to an aspect of the present invention is a method of making an initial setting for an information processing device having an access point function for wireless communication by using a terminal device. The initial setting method includes, by the terminal device, acquiring a service set identifier of the access point function from the information processing device; by the information processing device, generating a passcode and displaying information associated with the passcode on a display; by the terminal device, acquiring the passcode from an image having been displayed on the display; by the terminal device, making a wireless connection to the information processing device by using the acquired service set identifier and the acquired passcode; by the terminal device, transmitting, to the information processing device, setting information for a wireless connection to an external access point; and by the information processing device, registering the setting information for the wireless connection to the external access point.

An information processing device according to another aspect of the present invention includes an access point function that sets a service set identifier and a passcode that are used in an initial setting, an initial setting management section that displays information associated with the passcode on a display, a registration section that receives setting information for a wireless connection to an external access point from a terminal device connected to the access point function and registers the setting information into a storage area, and a wireless setting section that sets a parameter for a wireless communication module by using the registered setting information.

A terminal device according to still another aspect of the present invention includes a wireless communication module that makes a wireless connection to an access point function of an information processing device by using a service set identifier and a passcode of the access point function of the information processing device, and a setting information provision section that transmits, to the information processing device, setting information for a wireless connection to an external access point. The terminal device further includes a passcode acquisition section that acquires the passcode corresponding to the service set identifier by analyzing an image displayed on a display.

It should be noted that any combination of the above constituent elements and any converted expression obtained by converting the expression of the present invention among a method, a device, a system, a recording medium, a computer program, and the like are also effective as aspects of the present invention.

BRIEF DESCRIPTION OF DRAWINGS

FIG. 6 is a sequence diagram illustrating a procedure of automatically signing in.

DESCRIPTION OF EMBODIMENT

Figure 1:
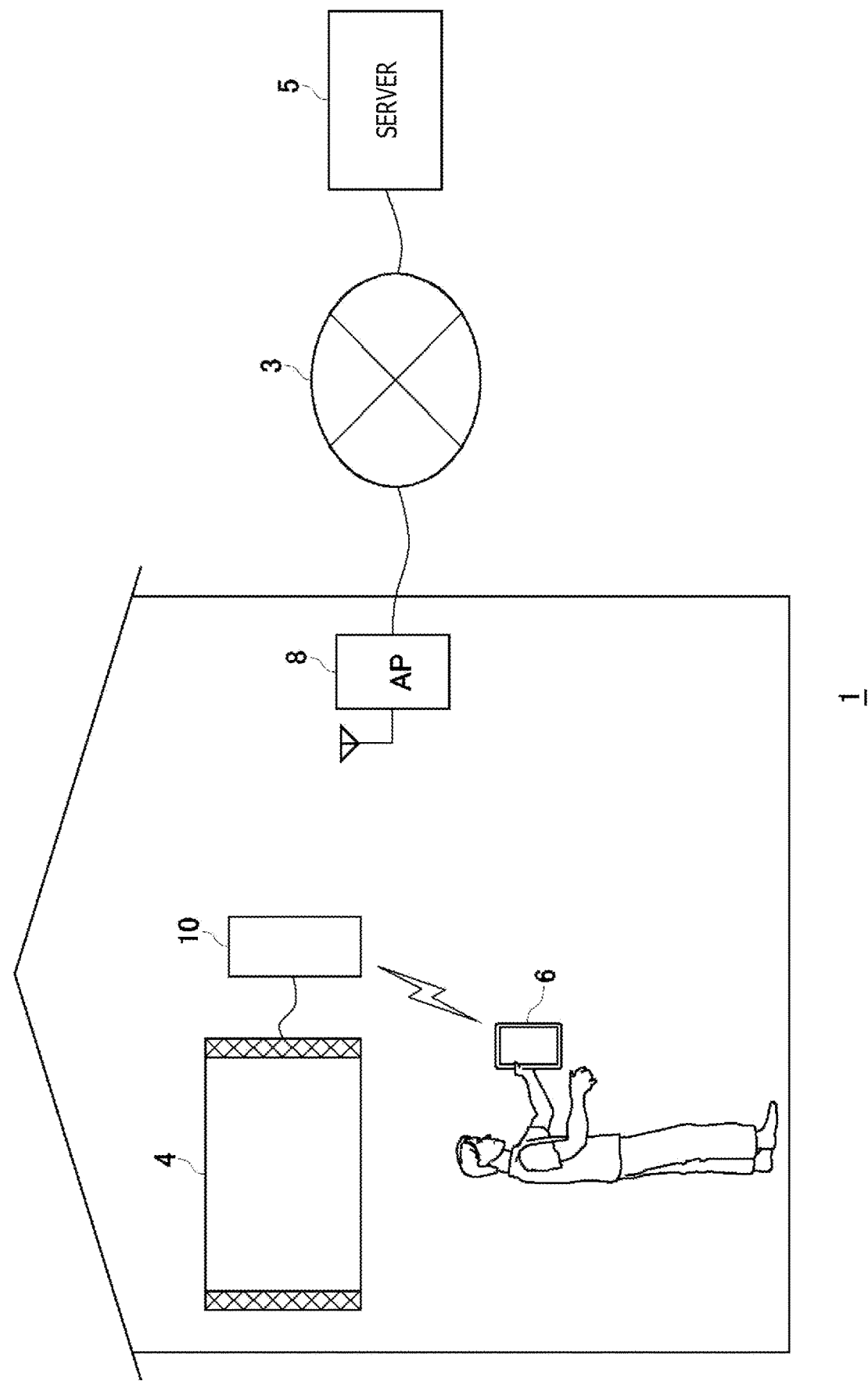
FIG. 1 is a diagram illustrating an information processing system according to an embodiment of the present invention.

FIG. 1 illustrates an information processing system 1 according to an embodiment of the present invention. The information processing system 1 includes a terminal device 6, a stationary-type game device 10, and a server 5. The server 5 may be implemented by a plurality of servers. An external access point (hereinafter referred to as an "AP") 8 installed at home of a user has functions of a wireless access point and a router and is connected to a network 3 which is the Internet. FIG. 1 illustrates a situation in which the user couples the newly purchased game device 10 to an output device 4 such as a television set to make initial settings for the game device 10. Note that the game device 10 is an example of the information processing device and may be a stationary-type one or a mobile-type one.

The server 5 provides the user with a network service. The server 5 manages account information for identifying the user, and the user signs in the server 5 with use of the account information to use the network service. In the present embodiment, the account information is constituted by a sign-in ID (e-mail address) and a password for signing in, and the user registers the sign-in ID and the password into the server 5 to thereby possess a network account that is the right of the usage of the network service. Note that the account information may be constituted by other information for identifying the user. In the present embodiment, the user having purchased the game device 10 has already registered the account information into the server 5.

The user replaces the game device 10 by purchase for various reasons. Typically, the launch of a game device of a new version becomes a trigger of the replacement of the game device 10 by purchase. In order to make it possible to play a game with the game device 10, the user couples the game device 10 to a television set and registers the account information into the game device 10 after the completion of initial settings such as the selection of a language to be used, the setting for a wireless connection, the setting of a date and a time of day, and the setting for power saving. With such work, the user becomes able to play the game, and further, becomes able to use the network service.

In the present embodiment, a method of registering, into the game device 10, setting information that a user uses to, through the use of the terminal device 6, connect the game device 10 to the AP 8 which is an external access point will be described. The terminal device 6 is a smartphone or a tablet device possessed by the user and may be a mobile-type electronic device having a wireless communication function. Setting information for the wireless connection in a game device having been used until then, for example, in a game device of a previous version is inherited to the setting information to be registered into the game device 10. For this reason, the user preliminarily uploads, to the server 5, the setting information for the wireless connection from the game device of the previous version before the purchase of the game device 10 of a new version.

For the upload of the setting information, various methods can be considered. A method may be employed for providing an item for uploading the setting information for the wireless connection on a menu screen of the game device of the previous version and allowing the user to select the item and thereby upload, to the server 5, the setting information for the wireless connection. Further, a method may be employed for making it possible to, when the user logs in the game device of the previous version next time, instruct, from an external device or the like, the user to upload, to the server 5, the setting information for the wireless connection. No matter which of the methods is employed, for the purpose of causing the setting information for the wireless connection to be inherited to the game device 10 of the new version, while the game device of the previous version is being connected to the AP 8, preliminarily, the user uploads, to the server 5, the setting information for the wireless connection, and the server 5 stores the setting information for the wireless connection in a way that associates the setting information with the sign-in ID of the user. When making the initial setting for the game device 10, the user causes the setting information to be read from the server 5 into the terminal device 6 and be transmitted from the terminal device 6 into the game device 10. Note that, in a case where the game device of the previous version has the function of transmitting, to the terminal device 6, the setting information for the wireless connection, the terminal device 6 may acquire, from the game device of the previous version, the setting information for the wireless connection.

Figure 2:
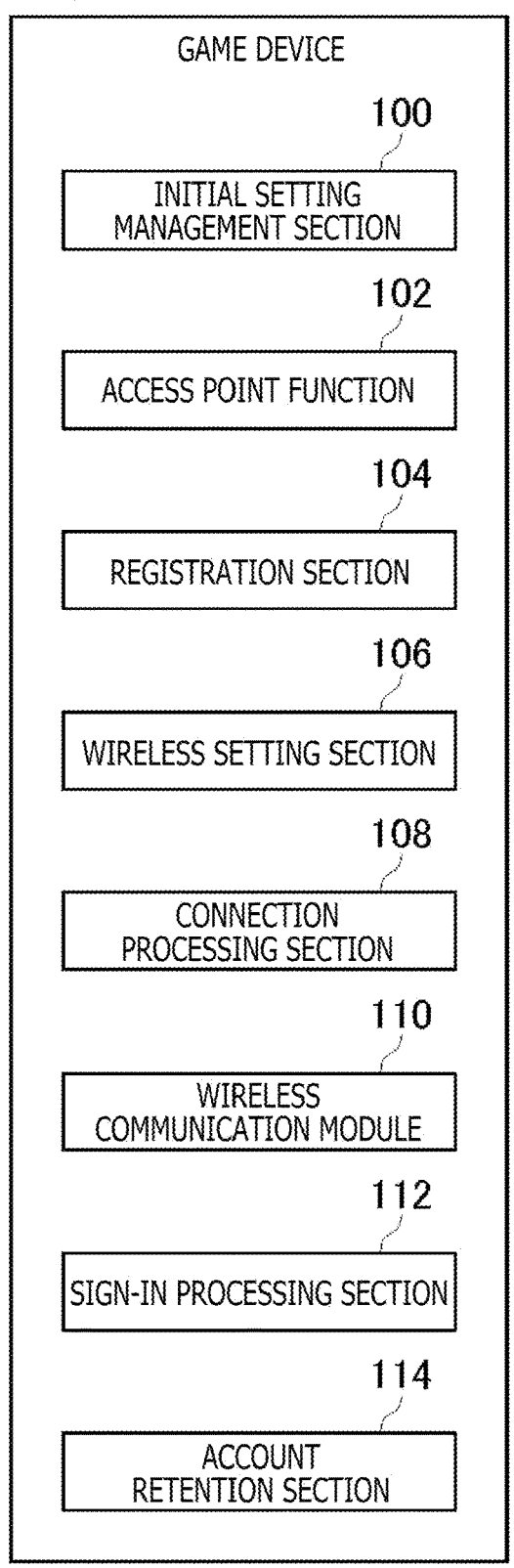
FIG. 2 is a diagram illustrating functional blocks used in an initial setting for a game device.

FIG. 2 illustrates functional blocks used in the initial setting for the game device 10. The game device 10 includes an initial setting management section 100, an access point function 102, a registration section 104, a wireless setting section 106, a connection processing section 108, a wireless communication module 110, a sign-in processing section 112, and an account retention section 114.

In FIG. 2, each of elements described as the functional blocks performing various kinds of processing can be configured by a circuit block, a memory, and other large-scale integration (LSI) circuits when implemented using hardware. Each of the elements can be configured to achieve its function by a program loaded in a memory, etc. when implemented using hardware. Therefore, it is to be understood by those skilled in the art that each of the functional blocks can be configured to achieve its functions in various forms, that is, in the form of only hardware, in the form of only software, and in the form of the combination of hardware and software, and the implementation form of each of the functional blocks is not to be limited to any one of the above forms.

Figure 3:
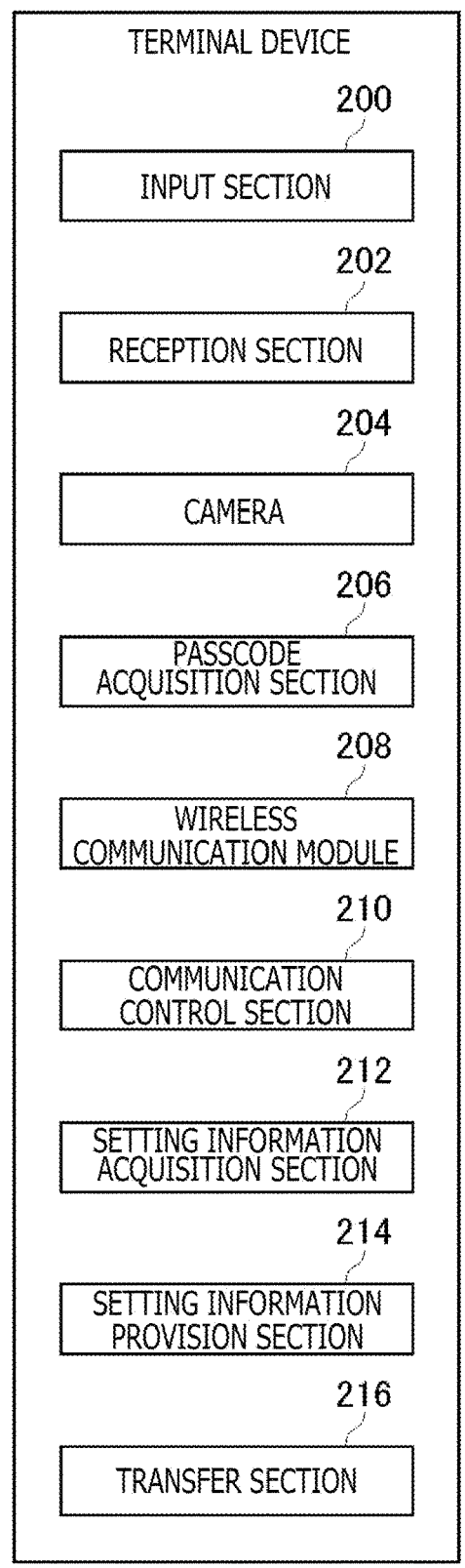
FIG. 3 is a diagram illustrating functional blocks of a terminal device.

FIG. 3 illustrates functional blocks of the terminal device 6. The terminal device 6 includes an input section 200, a reception section 202, a camera 204, a passcode acquisition section 206, a wireless communication module 208, a communication control section 210, a setting information acquisition section 212, a setting information provision section 214, and a transfer section 216.

In FIG. 3, each of elements described as the functional blocks performing various kinds of processing can be configured by a circuit block, a memory, and other LSI circuits when implemented using hardware. Each of the elements can be configured to achieve its function by a program loaded in a memory, etc. when implemented using software. Therefore, it is to be understood by those skilled in the art that each of the functional blocks can be configured to achieve its functions in various forms, that is, in the form of only hardware, in the form of only software, and in the form of the combination of hardware and software, and the implementation form of each of the functional blocks is not to be limited to any one of the above forms. In the present embodiment, at least some of the functional blocks illustrated in FIG. 3 may be configured to achieve its function by executing an application for the initial setting.

Hereinafter, a procedure of registering the setting information for the wireless connection into the game device 10 by using the terminal device 6 will be described. Account information of a user is already registered in the terminal device 6, and the user is in a state of signing in the server 5 by connecting the terminal device 6 to the server 5 via the AP 8. The setting information for the wireless connection, which is to be inherited to the game device 10, is retained in the server 5.

Figure 4:
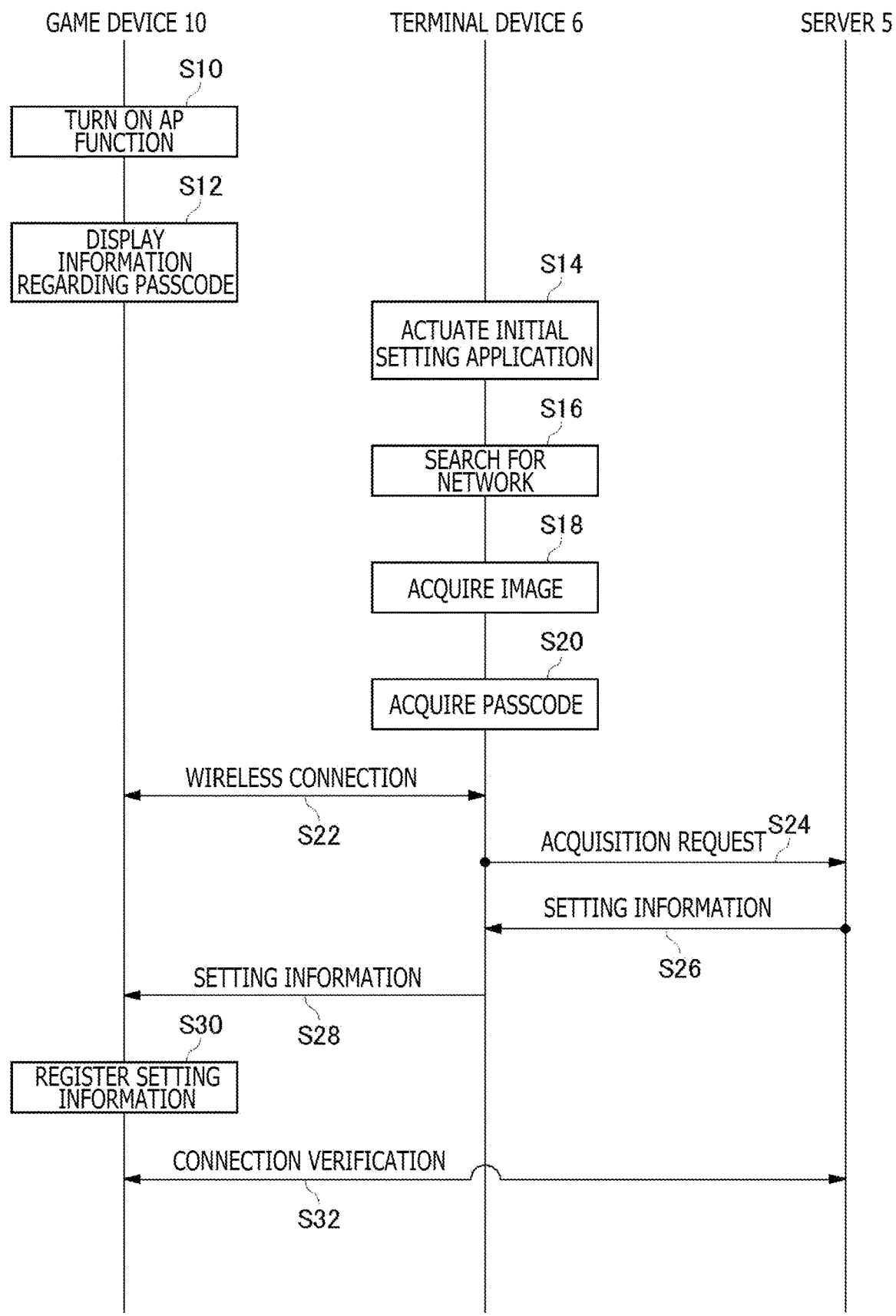
FIG. 4 is a sequence diagram illustrating a registration procedure for registering setting information for a wireless connection.

FIG. 4 is a sequence diagram illustrating a registration procedure for registering the setting information for the wireless connection. The initial setting management section 100 turns on the access point function 102 of the game device 10 (S10) to start the registration processing for registering the setting information for the wireless connection. The access point function 102 sets an SSID and a passcode that are used in the initial setting. For example, the SSID may be a letter string that necessarily includes letters, Initial_SetUp, at its beginning, and the access point function 102 waits for an external access for the set SSID from the terminal device 6. The access point function 102 generates a temporary passcode. The passcode may be generated at random. The access point function 102 wirelessly transmits the SSID, and specifically, transmits a beacon packet including the SSID. The initial setting management section 100 receives the temporary passcode from the access point function 102 and displays information associated with the passcode on the output device 4 (S12).

Figure 5:
FIG. 5 is a diagram illustrating an example of information associated with a passcode and displayed by an output device.

FIG. 5 illustrates an example of the information associated with the passcode and displayed by the output device 4. In the present example, a QR code (registered trademark) in which the passcode is embedded is displayed by the output device 4. Displaying, by the initial setting management section 100, the QR code in which the passcode is embedded on the output device 4 makes it possible for only the user being around the output device 4 to acquire the information associated with the passcode. Further, dynamically generating the temporary passcode at random by the access point function 102 makes it possible to heighten the security of the initial setting, as compared with a case where the passcode is fixed.

In the terminal device 6, the user activates the application for the initial setting (S14). The wireless communication module 208 receives one or more beacon packets transmitted from one or more access points existing in a surrounding area, and the communication control section 210 acquires one or more SSIDs included in the one or more beacon packets (S16). The communication control section 210 identifies an SSID including the letters, Initial_SetUp, at its beginning among the acquired one or more SSIDs. Upon identification of the SSID including the letters, Initial_SetUp, at its beginning, the communication control section 210 displays a message "Read the QR code displayed on TV, please," on the display of the terminal device 6 and simultaneously activates the camera 204.

The user orients the camera 204 of the terminal device 6 toward the output device 4 and acquires the information (the QR code) having been displayed on the display of the output device 4 (S18). The passcode acquisition section 206 acquires the passcode corresponding to the network (SSID) by analyzing an image including the QR code (S20). Note that, although, in S16, the communication control section 210 has acquired the one or more SSIDs included in the one or more beacon packets, the SSID may be embedded in the QR code displayed on the display without being published by a corresponding beacon packet. At this time, in S20, the passcode acquisition section 206 acquires the SSID together with the passcode by analyzing the image including the QR code. The communication control section 210 notifies the wireless communication module 208 of the acquired SSID and passcode, and the wireless communication module 208 accesses the access point function 102 of the game device 10 by using the SSID and the passcode and makes a wireless connection to the access point function 102 (S22).

Upon establishment of the wireless connection between the terminal device 6 and the game device 10, the setting information acquisition section 212 transmits an acquisition request for requesting the setting information for the wireless connection, from the wireless communication module 208 to the server 5 via the AP 8 (S24). The server 5 extracts the setting information for the wireless connection, which is associated with the sign-in ID of the user, and transmits the extracted setting information to the terminal device 6 (S26). The setting information acquisition section 212 acquires the setting information for the wireless connection. Note that the setting information acquisition section 212 may acquire the setting information for the wireless connection from the server 5 immediately after the activation of the application for the initial setting. The setting information provision section 214 transmits, to the game device 10, the setting information for the wireless connection (S28).

In the game device 10, the registration section 104 receives the setting information for the wireless connection and registers it into a storage area (not illustrated) for storing the setting information (S30). With this operation, the registration processing for registering the wireless connection in the initial setting is ended. The wireless setting section 106 sets parameters for the wireless communication module 110, specifically, the SSID and the passcode for the wireless communication module 110, by using the registered setting information, and causes the wireless communication module 110 to make the wireless connection to the AP 8. The connection processing section 108 makes a connection verification for verifying the connection to the server 5 (S32), and upon end of the connection verification, the game device 10 and the server 5 enters a state in which both are connected to each other.

Note that, at this time point, the account information of the user has not yet been registered in the game device 10. Thus, the sign-in processing section 112 performs processing for automatically acquiring the user' account information registered in the server 5.

FIG. 6 is a sequence diagram illustrating a procedure of automatically signing in. The sign-in processing section 112 confirms with the server 5 whether or not the system software of the game device 10 is the latest one (S40). Here, in a case where the system software is not the latest one, the sign-in processing section 112 determines that system updating is necessary (Y of S40) and downloads the latest system software from the server 5 (S42). The initial setting management section 100 installs the latest system software, and then reactivates it (S44).

After the system reactivation or in a case where, in S40, the latest system software has already been installed (N of S40), the sign-in processing section 112 requests, to the server 5, account information that the user uses to sign in the server 5. Specifically, the sign-in processing section 112 requests an authentication code (code for signing in) that the user uses to sign in the server 5 from the game device 10 (S46), and the server 5 issues a code for signing in having been generated at random (S48). The sign-in processing section 112 transfers the code for signing-in to the terminal device 6 (S50), and in the terminal device 6, the transfer section 216 transfers the received code for signing in, together with the sign-in ID of the user, to the server 5 (S52). Upon confirmation of a fact that the issued code for signing in and the code for signing in having been transmitted from the terminal device 6 coincide with each other, the server 5 determines that the user is an authorized user.

Note that, although, in S50, the sign-in processing section 112 has transferred the code for signing in to the terminal device 6, the sign-in processing section 112 may display information associated with the code for signing in on the output device 4. As having already been described with regard to the passcode for the access point function 102, the sign-in processing section 112 may display a QR code in which the code for signing in is embedded on the output device 4. At this time, the user orients the camera 204 of the terminal device 6 toward the output device 4, and the camera 204 acquires an image including the information (QR code) having been displayed on the display of the output device 4. The terminal device 6 acquires the code for signing in by analyzing the image including the QR code, and the transfer section 216 may transfer, to the server 5, the code for signing in, together with the sign-in ID of the user.

After having notified the game device 10 of a fact that the server 5 has succeeded in the user authentication, the sign-in processing section 112 requests the account information of the user to the server 5 (S54), and the server 5 transmits the account information of the user (S56). The sign-in processing section 112 acquires the account information of the user (S58) and causes the account retention section 114 to retain the acquired account information. With this operation, as a result, the account information of the user is stored in the account retention section 114, and the sign-in processing section 112 allows the user to sign in (S60).

Note that, before allowing the user to sign in, the sign-in processing section 112 may cause the output device 4 to display information for specifying the user that is to sign in. In many cases, it is considered that users desire to automatically sign in, but there may be a user who makes only the initial setting and does not want to sign in at that time point. Thus, the configuration is made to cause the output device 4 to display a message "Do you want to sign in now?" together with an icon of the user to enable the user to input, from the input section 200 of the terminal device 6, either operational information indicating that the user agrees to sign in or operational information indicating that the user does not agree to sign in. The input operational information is received by the reception section 202 and is transmitted to the game device 10 from the wireless communication module 208.

Upon receipt, from the terminal device 6, of the operational information indicating the user's agreement to sign in, the sign-in processing section 112 may allow the user to sign in. On the other hand, upon receipt, from the terminal device 6, of the operational information indicating the user's disagreement to sign in, the sign-in processing section 112 does not allow the user to sign in, and deletes the account information of the user from the account retention section 114. Note that, in a case where the user wants to sign in later, just registering the account information into the account retention section 114 according to a predetermined procedure enables the user to sign in.

Heretofore, the present invention has been described on the basis of the above embodiment. The above embodiment is an example, and it is to be understood by those skilled in the art that various modification examples are possible in the combinations of the individual constituent elements and individual processing processes of the above embodiment, and that such modification examples are also within the scope of the present invention.

In the present embodiment, the game device 10 is an example of the information processing device, and the information processing device may be an electronic device that needs the initial setting, such as a personal computer or a tablet.

INDUSTRIAL APPLICABILITY

The present invention can be applied to technical fields in relation to the initial setting.

REFERENCE SIGNS LIST

1: Information processing system
3: Network
4: Output device
5: Server
6: Terminal device
8: AP
10: Game device
100: Initial setting management section
102: Access point function
104: Registration section
106: Wireless setting section
108: Connection processing section
110: Wireless communication module
112: Sign-in processing section
114: Account retention section
200: Input section
202: Reception section
204: Camera
206: Passcode acquisition section
208: Wireless communication module
210: Communication control section
212: Setting information acquisition section
214: Setting information provision section
216: Transfer section

The invention claimed is:

1. An initial setting method for an information processing device having an access point function for wireless communication, the initial setting method comprising:
   by the information processing device, uploading a service set identifier and a passcode for an external access point to a server;
   by the information processing device, turning on the access point function to start registration processing;
   by the terminal device, acquiring the service set identifier of the access point function from the information processing device;
   by the information processing device, generating the passcode and displaying information associated with the passcode on a display;
   by the terminal device, acquiring the passcode from an image displayed on the display;
   by the terminal device, accessing the access point function of the information processing device to make a wireless connection to the information processing device by using the acquired service set identifier and the acquired passcode;
   by the terminal device, transmitting, to the information processing device, the setting information for the wireless connection to the external access point; and
   by the information processing device, registering the setting information for the wireless connection to the external access point.

2. The initial setting method according to claim 1, wherein the terminal device acquires the passcode by analyzing the image having been displayed on the display.

3. The initial setting method according to claim 2, wherein the terminal device acquires the service set identifier of the access point function by analyzing the image having been displayed on the display.

4. The initial setting method according to claim 1, wherein the information processing device wirelessly transmits the service set identifier of the access point function, and the terminal device receives the service set identifier from the information processing device.

5. The initial setting method according to claim 1, wherein the information processing device makes the wireless connection to the external access point by using the setting information, and the information processing device requests account information that a user uses to sign in.

6. The initial setting method according to claim 5, wherein the information processing device displays information for specifying a user that is to sign in on the display, and upon reception, from the terminal device, of operational information indicating that the user agrees to sign in, the information processing device allows the user to sign in.

7. The initial setting method according to claim 6, wherein, upon reception, from the terminal device, of operational information indicating that the user does not agree to sign in, the information processing device deletes the account information of the user.

8. The initial setting method according to claim 1, wherein the information processing device is a game device.

9. The initial setting method according to claim 8, wherein the uploading the service set identifier and the passcode for the external access point to the server is performed by a previous game device.

10. The initial setting method according to claim 1, wherein the image is a QR code.

11. The initial setting method according to claim 10, further comprising, prior to the terminal device transmitting the setting information to the information processing device, the terminal device transmits to the server, an acquisition request for requesting the setting information.

12. The initial setting method according to claim 11, wherein the acquisition request is transmitted via the external access point.

13. The initial setting method according to claim 12, wherein the terminal device acquires the passcode by analyzing the image displayed on the display.

14. The initial setting method according to claim 13, wherein the terminal device acquires the service set identifier of the access point function by analyzing the image displayed on the display.

15. The initial setting method according to claim 1, wherein the uploading the service set identifier and the passcode for the external access point to the server is performed by a previous game device.

16. The initial setting method according to claim 15, wherein the image is a QR code.

17. The initial setting method according to claim 16, further comprising, prior to the terminal device transmitting to the information processing device the setting information, the terminal device transmits to the server, an acquisition request for requesting the setting information.

18. The initial setting method according to claim 17, wherein the acquisition request is transmitted via the external access point.

19. The initial setting method according to claim 18, wherein the terminal device acquires the passcode by analyzing the image displayed on the display, and the terminal device acquires the service set identifier of the access point function by analyzing the image displayed on the display.

20. An initial setting method for an information processing device having an access point function for wireless communication, the initial setting method comprising:

by the information processing device, uploading a service set identifier and a passcode for an external access point to a server;

by the information processing device, turning on the access point function to start registration processing, the access point function setting a service set identifier and a temporary passcode;

by the terminal device, activating an application for initial setting and acquiring the service set identifier of the access point function from the information processing device;

by the information processing device, generating the passcode and displaying information associated with the passcode on a display;

by the terminal device, acquiring the passcode from an image displayed on the display;

by the terminal device, accessing the access point function of the information processing device to make a wireless connection to the information processing device by using the acquired service set identifier and the acquired passcode;

by the server, extracting setting information for the wireless connection and transmitting the setting information to the terminal device;

by the terminal device, transmitting, to the information processing device, the setting information for the wireless connection to the external access point; and by the information processing device, registering the setting information for the wireless connection to the external access point.

* * * * *